United States Patent
Liu et al.

(10) Patent No.: US 10,346,206 B2
(45) Date of Patent: Jul. 9, 2019

(54) SYSTEM, METHOD AND COMPUTER PROGRAM PRODUCT FOR RESOURCE MANAGEMENT IN A DISTRIBUTED COMPUTATION SYSTEM

(71) Applicant: International Business Machines Corporation, Armonk, NY (US)

(72) Inventors: Liang Liu, Beijing (CN); Junmei Qu, Beijing (CN); ChaoQiang Zhu, Beijing (CN); Wei Zhuang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/249,361

(22) Filed: Aug. 27, 2016

(65) Prior Publication Data

US 2018/0060128 A1    Mar. 1, 2018

(51) Int. Cl.
*G06F 9/50* (2006.01)
*G06F 9/48* (2006.01)

(52) U.S. Cl.
CPC .......... *G06F 9/5011* (2013.01); *G06F 9/4881* (2013.01)

(58) Field of Classification Search
CPC ............................ G06F 9/5011; G06F 9/4881
See application file for complete search history.

(56) References Cited

U.S. PATENT DOCUMENTS

| 2012/0167101 | A1* | 6/2012 | Kandula | H04L 67/325 |
| | | | | 718/102 |
| 2017/0185450 | A1* | 6/2017 | Le Bars | G06F 9/4887 |
| 2017/0213257 | A1* | 7/2017 | Murugesan | G06Q 30/0277 |

OTHER PUBLICATIONS

Mel, et al. "The NIST Definition of Cloud Computing". Recommendations of the National Institute of Standards and Technology. Nov. 16, 2015.

* cited by examiner

*Primary Examiner* — Jacob D Dascomb
(74) *Attorney, Agent, or Firm* — Grant Johnson, Esq.; McGinn IP Law Group, PLLC

(57) ABSTRACT

A method, system, and computer program product, include determining a task resource consumption predicted for each of one or more tasks being executed on a node, wherein the task resource consumption is a function of time and predicting a node resource consumption of the node based at least on the predicted task resource consumption, wherein the node resource consumption is a function of time.

19 Claims, 7 Drawing Sheets

SYSTEM, METHOD AND COMPUTER PROGRAM PRODUCT FOR RESOURCE MANAGEMENT IN A DISTRIBUTED COMPUTATION SYSTEM

BACKGROUND

The present invention relates generally to a distributed computation method, and more particularly, but not by way of limitation, to a system, method, and computer product used for a node of a distributed computation system.

With fast development of computation technology, applications have emerged in which need huge computation capacity. Distributed computation technology has been known in which an application is divided into a number of small parts, and the small parts are distributed to a plurality of computing devices for parallel processing. By virtue of the distributed computation technology, the overall time for the computation can be reduced and the computation efficiency can be improved.

A so-called "Hadoop" system has been developed as an advanced distributed computation framework which allows for execution of large applications on large groups of inexpensive hardware devices. A Hadoop system has a distributed file system called HDFS (Hadoop Distributed File System) in which a file may be divided into one or more blocks and the one or more blocks may be stored in a plurality of computing devices. In addition, in a Hadoop system, operations in an application are abstracted into Map operations and Reduce Operations. A Map operation is to process an input Key/Value pair and to output a Key/Value pair, and a plurality of Map operations may be performed in parallel. A Reduce operation is to work on the plurality of Key/Value pairs output from the Map operations and to output one or more Key/Value pairs the number of which is typically smaller than that of the plurality of Key/Value pairs.

Resource allocation in version 1.0 of Hadoop is in unit of "slot" which is a minimum resource allocation unit, and the resource in each slot is static and unified. Resource allocation in version 2.0 (also called "Yarn") of Hadoop is in unit of "container", and the resource in each container is user defined but static.

SUMMARY

In an exemplary embodiment, the present invention can provide a computer-implemented method in a distributed computation system, including determining a task resource consumption predicted for each of one or more tasks being executed on a node, wherein the task resource consumption is a function of time and predicting a node resource consumption of the node based at least on the predicted task resource consumption, wherein the node resource consumption is a function of time.

One or more other exemplary embodiments include a computer program product and a system.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

Figure 1:
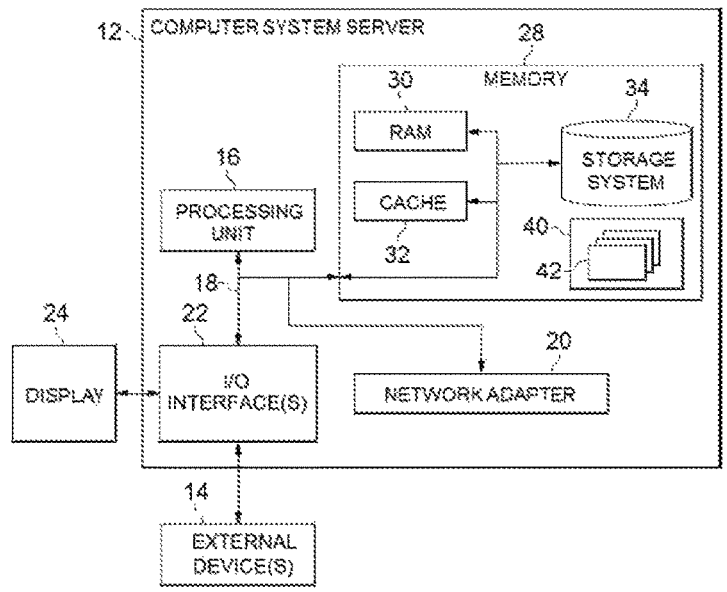
FIG. 1 depicts a cloud computing node 10 according to an embodiment of the present invention.

The invention will now be described with reference to FIG. 1-10, in which like reference numerals refer to like parts throughout. It is emphasized that, according to common practice, the various features of the drawing are not necessarily to scale. On the contrary, the dimensions of the various features can be arbitrarily expanded or reduced for clarity.

Figure 4:
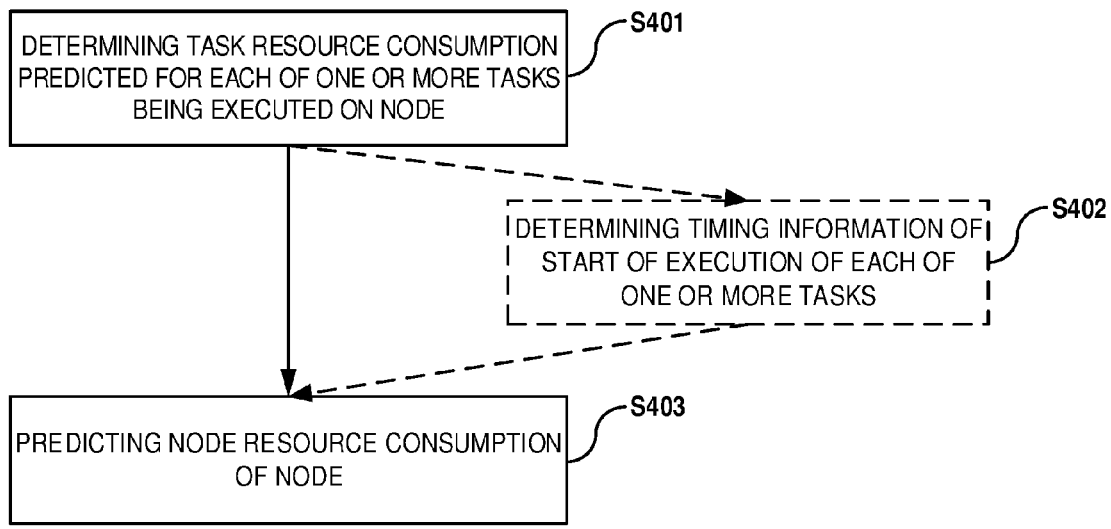
FIG. 4 is a flowchart showing an exemplary method implemented in a distributed computation system according to an exemplary implementation of the present invention.

With reference now to the example depicted in FIG. 4, the method 100 includes various steps for determining a task resource consumption and predicting a node resource consumption. As shown in at least FIG. 1, one or more computers of a computer system 12 according to an embodiment of the present invention can include a memory 28 having instructions stored in a storage system to perform the steps of FIG. 4.

Although one or more embodiments (see e.g., FIGS. 1 and 9-10) may be implemented in a cloud environment 50 (see e.g., FIG. 9), it is nonetheless understood that the present invention can be implemented outside of the cloud environment.

Figure 2:
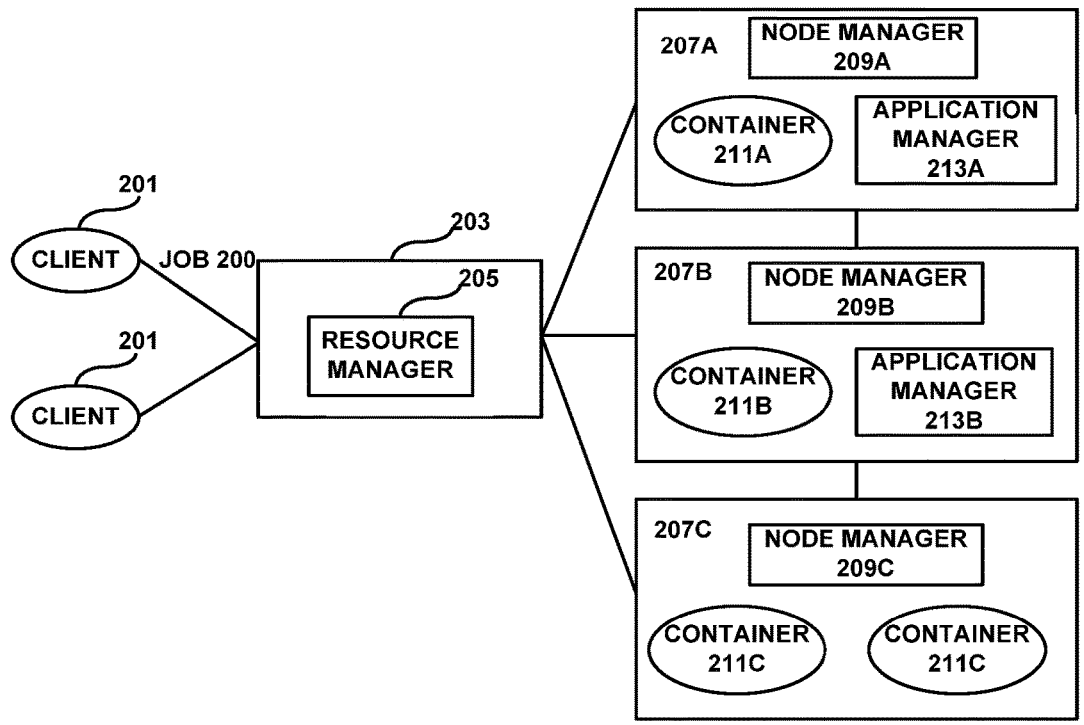
FIG. 2 shows an example of a configuration of an exemplary distributed computation system based on which exemplary implementations of the present invention may be carried out.

With reference to FIG. 2, an example of a configuration of an exemplary distributed computation system will be explained. FIG. 2 shows an example of a configuration of an exemplary distributed computation system based on which exemplary implementations of the present disclosure may be carried out. The exemplary distributed computation system shown in FIG. 2 may be based on, for example, a Hadoop system (version 2.0).

The exemplary distributed computation system may include, for example, a management node 203 and a plurality of computation nodes (slave nodes) 207A, 207B and 207C. Each of the management node 203 and the computation nodes 207A, 207B and 207C may be a computing device. Although three computation nodes are shown in FIG. 2, the number of the computation nodes may be arbitrary.

The management node 203 may comprise, for example, a resource manager 205 which is in charge of job/task scheduling and/or resource management. "Resource" herein may refer to, for example but not limited to, memory, CPU, network, I/O (storage resource), and/or any combination thereof. According to an exemplary implementation, the resource manager 205 may receive a job 200 submitted from a client 201, divide the job 200 into several tasks and assign the tasks to one or more of the computation nodes 207A, 207B and 207C. Herein a job may be defined by, for example, a set of computation logics and input data. The input data may, for example, have been stored in one or more of the computation nodes in a distributed way in advance. A task may also be referred to as a sub-job which may be defined, for example, by a subset of the computation logics and a subset of the input data. In the following, tasks or jobs of the same/different types may mean tasks or jobs having the same/different computation logics.

In addition, each of the computation nodes 207A, 207B and 207C may comprise a node manager 209 which may monitor processes occurring on the computation node and may implement actual resource allocation on the computation node.

An application manager 213 may be established on a computation node 207, and may monitor and manage all tasks of a same job even if these tasks are executed on different computation nodes. For example, although the application manager 213A may be established on the computation node 207A, it can monitor and manage all tasks of the same job which are executed on one or more of the computation nodes 207A, 207B and 207C. It is possible that there are one or more application managers established on one node. It is also possible that some of the computation nodes (for example, the computation node 207C) do not have any application manager and the tasks being executed on such computation nodes are monitored and managed by an application manager which resides on another computation node.

Each of the computation nodes may have resources. According to an implementation, the resources allocated for the tasks may be in terms of "container", wherein each container is a unit of resource to be allocated to a corresponding task to enable execution of the task. A container may be allocated with a static amount of resource, which, in many cases, may be a maximum resource that would be utilized during execution of a corresponding task. Different containers may occupy the same or different amounts of resource. It is possible that more than one container may be present on a node, as illustrated by the example of containers 211C on the computation node 207C. According to an exemplary implementation, a container may be implemented with a virtual machine such as a Java virtual machine for executing a corresponding task. Other mechanisms other than a virtual machine may also be used for implementing the container, as long as they are able to execute tasks by utilizing certain resources.

Each of the resource manager, the node manager and the application manager may be implemented as a hardware module, a software module or any combination thereof.

The processes to be described below may, for example, be implemented based on the exemplary distributed computation system shown in FIG. 2. However, the distributed computation system in which the embodiments of the present disclosure may be implemented is not limited to a Hadoop System or the one shown in FIG. 2, but the processes of the present disclosure may also be implemented in any other distributed computation system such as a Spark system.

According to an existing resource management method, resource management on a node in a distributed system is usually based on a static presumption of current node resource consumption such as the maximum resource consumptions of tasks being executed on the node. More specifically, if the resource determined by subtracting the maximum resource consumptions of the currently executed tasks from the full resource of the node is larger than a maximum resource consumption of a new task, the task can be assigned to the node. Therefore, the existing method may possibly lead to insufficient utilization of resources because the maximum resource consumption might occur for only a short period of time.

Figure 3:
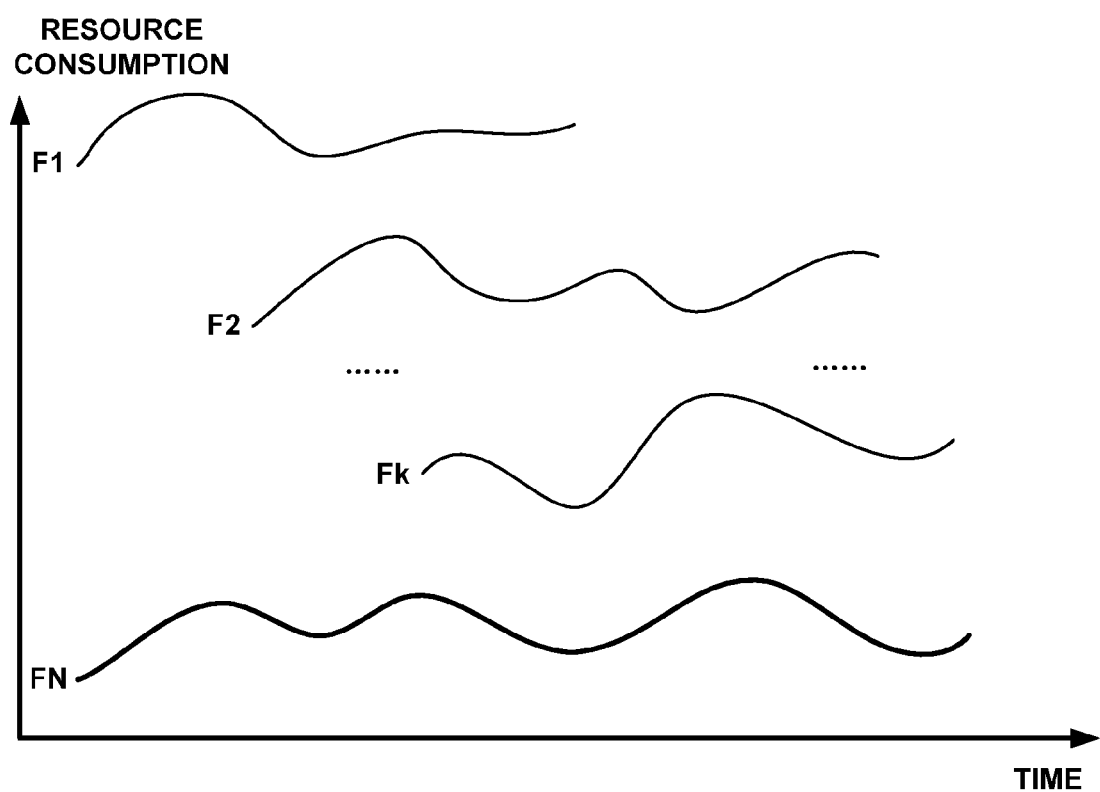
FIG. 3 shows illustrative principle of some exemplary implementations of a method according to the present invention.

The present disclosure proposes a method of which the illustrative principle of some of the exemplary implementations is shown in FIG. 3. According to the method, a predicted task resource consumption such as those shown as F1, F2, . . . Fk is determined for each of one or more tasks which are being executed on the node (where k is the number of the tasks). A node resource consumption (which is, for example, a combination of the task resource consumptions) such as that shown as FN may be predicted for the node based on the predicted task resource consumption F1, F2, . . . Fk. In this way, a node resource consumption reflecting dynamic information on how the resource consumption will be changed over time may be predicted, and may, for example, be used for resource management.

Exemplary processes according to the present disclosure will be described in more detail with reference to FIG. 4. FIG. 4 is a flowchart showing an exemplary method implemented in a distributed computation system according to the present disclosure. The exemplary method shown in FIG. 4 may be computer-implemented in a computation node of a distributed computation system (for example, any of the nodes 207A, 207B and 207C in the system shown in FIG. 2), and may comprise a step S401 of determining a task resource consumption predicted for each of one or more tasks being executed on the node, and a step S403 of predicting a node resource consumption of the node based at least on the predicted task resource consumption. According to an exemplary implementation, the steps S401 and S403 may be implemented by the node manager in charge of the node.

In the following, exemplary implementations of each of the steps S401 and S403 will be described in more detail.

In the step S401, a task resource consumption predicted for each of one or more tasks being executed on the node is determined Here "one or more tasks being executed on the node" may mean, for example, one or more tasks for which the executions have been started but have not been finished yet. According to an exemplary implementation, the one or more tasks may be of different types (have different computation logics).

Here, the predicted task resource consumption may be a function of time. The task resource consumption reflects how a resource consumption of a task changes over time, and therefore may also be referred to as a resource consumption profile. According to an exemplary implementation, a task resource consumption for a task may take the form of a mathematical expression. The mathematical expression may represent a continuous or discontinuous curve, each point of which represents a value of a task resource consumption at a certain point of time. The mathematical expression may comprise a linear function, a polynomial function, a logarithm function, an exponential functional function, other kinds of mathematical functions, or any combination thereof. As an alternative, a task resource consumption for a task may take the form of a correspondence between discrete values of resource consumption and points of time. Such a correspondence may be stored in a table. The task resource consumption may take any form as long as it reflects how a resource consumption of a task changes over time.

In a distributed computation infrastructure, jobs of the same type (the same computation logics) may be executed repetitively with different input data. For example, a certain type of jobs may be to count the number of appearance of a keyword (for example, the word "computer") in an article, and multiple jobs of the same type may be executed each with a different keyword and/or with a different article. Although with different input data, the computation logics for these jobs may be the same, and the computation logics for the same type of tasks are also the same across the jobs. Even with different input data sizes, tasks having the same computation logics may have task resource consumptions following the same way of change of value. Thus, it is possible to predict how the value of a task resource consumption of a task will change with time based on history data which has been obtained by monitoring tasks having the same computation logics in advance.

Therefore, according to an exemplary implementation, the predicted task resource consumption of at least one of the one or more tasks may be predicted based on one or more pre-stored task resource consumptions of one or more previously monitored tasks, wherein the monitored tasks and the tasks to be predicted have the same computation logics. The pre-stored task resource consumptions and related information (for example, the way of change and a relationship between the durations of each stage and the input data sizes) of the monitored tasks may have been generated and stored in advance.

There may be tasks for which the input data size may vary from task to task. For example, Reduce tasks having the same computation logics of a job in a Hadoop system may have different input data sizes. For such tasks the input data sizes of which may vary, although tasks of the same computation logics and different input data sizes may have task resource consumptions following the same way of change of value, durations of the tasks may be different depending on the input data sizes and thus the specific resource consumption profiles (for example, from when and how long a function of each stage of the resource consumption profile will extend) may be different depending on the input data sizes. Thus, the task resource consumption of a task may be predicted based on computation logics of the task and an input data size of the task.

Figure 5:
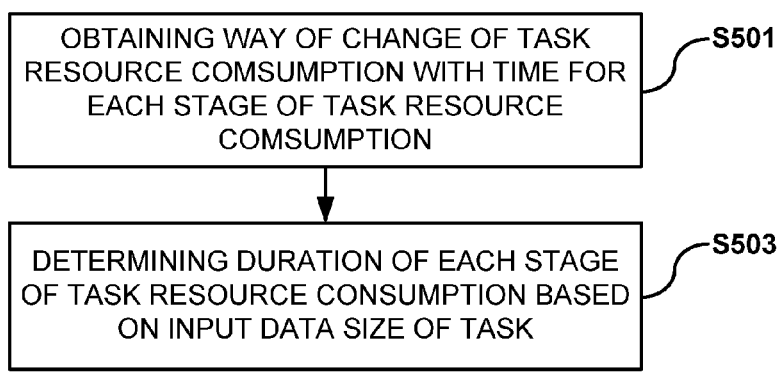
FIG. 5 is a flowchart showing an exemplary method of prediction of a task resource consumption according to an exemplary implementation of the present invention.

FIG. 5 is a flowchart showing an exemplary method of prediction of a task resource consumption according to an exemplary implementation of the present disclosure. According to the exemplary implementation, for a task of which the input data size may vary, prediction of the task resource consumption may comprise a step S501 of obtaining (for example, retrieving from a memory storage) a way of change of the task resource consumption with time for each stage of the task resource consumption and a step S503 of determining a duration of each stage of the task resource consumption based on an input data size of the task. The way of change depends on the computation logic (the type) of the task, and the duration depends on the input data size of the task. According to an exemplary implementation, the relationship between the ways of change and the computation logics (types) of the task as well as the relationship between the durations of each stage and the input data sizes for each of various computation logics (types) may both be generated in advance based on training data for the same type of monitored tasks, and may be pre-stored. During prediction, a way of change of the stage may be retrieved corresponding to the type and stage of the task, and the duration of the stage may be retrieved corresponding to the stage and the input data size according to the relationship. Herein the "way of change" of the value of a task resource consumption means the trend of change of the value. For example, the way of change may indicate the value is gradually increased or decreased or constant, or is first increased to a certain value and then decreased to a certain value, or the like. The way of change may be characterized by a mathematical expression (for example, the prototype expression to be described in the following), a curve or graph indicating a trend of change, or a sequence of discrete numerical values. The way of change which is pre-stored may not comprise information on the absolute start time of each stage.

Figure 6A:
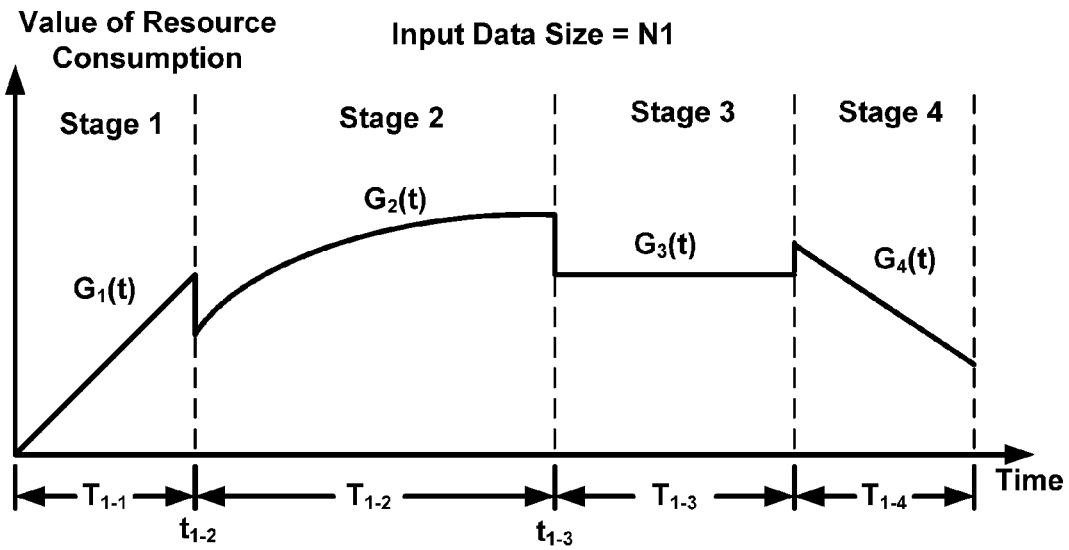
FIGS. 6A and 6B show exemplary monitored task resource consumptions of tasks of the same type but having different sizes of input data according to an exemplary implementation of the present invention.
Figure 6B:
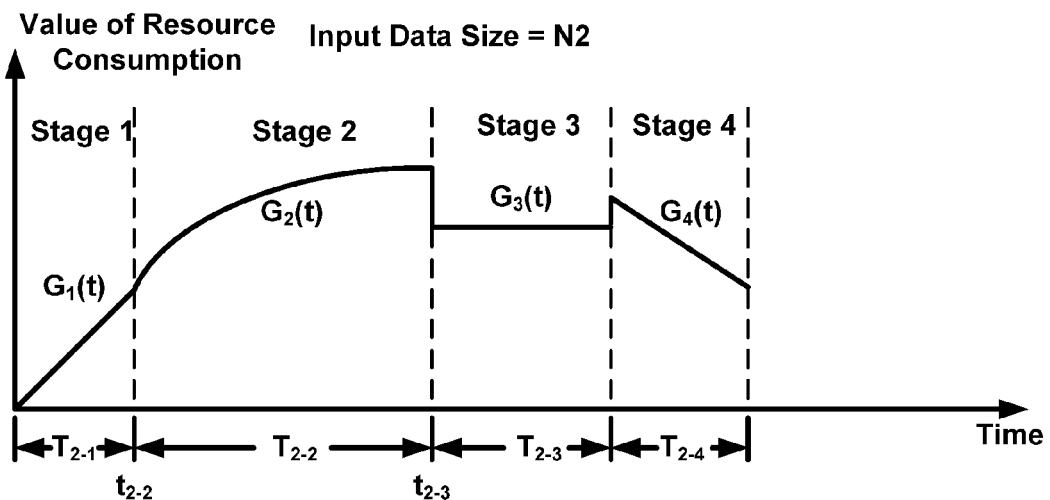

FIGS. 6A and 6B show exemplary task resource consumptions for tasks of the same type but having different input data sizes according to an exemplary implementation of the present disclosure. In order to predict a task resource consumption, task resource consumptions of tasks of the same type but having different input data sizes may have been monitored in advance as shown in FIGS. 6A and 6B. Although FIGS. 6A and 6B only show two task resource consumptions monitored for two tasks having, for example, an input data size of N1 and an input data size of N2 respectively, three or more task resource consumptions for tasks having different input data sizes may be monitored in advance as necessary. Such task resource consumptions may be pre-stored in storage devices of one or more nodes, in advance, for further use.

Since a task may comprise several computations performed in serial, the task resource consumption of the task may comprise several stages with different ways of change of value of the resource consumption, as shown in FIGS. 6A and 6B. In the example shown in FIG. 6A, the task resource consumption of a task with the input data size of N1 comprises four stages, with a stage 1 having an expression $G_1(t)$ which is, for example, an increasing linear function, a stage 2 having an expression $G_2(t)$ which is, for example, a quadratic function, a stage 3 having an expression $G_3(t)$ which is, for example, a constant and a stage 4 having an expression $G_4(t)$ which is, for example, a decreasing linear function. The expressions for the stages each of which has a certain duration constitute the function of the task resource consumption for the whole task.

Different tasks having the same computation logic but different input data sizes typically have the same number of stages in the task resource consumption, and each corresponding stage has the same way of change (for example, characterized by the same expression) for the tasks. For example, as shown in FIG. 6B, the task resource consumption of a task having the same computation logic as that of the task shown in FIG. 6A but with a different input data size of N2 also comprises four stages, and each of the stages also has the same expressions $G_1(t)$, $G_2(t)$, $G_3(t)$ and $G_4(t)$ respectively. The expression representing the way of change for each stage (e.g. $G_1(t)$, $G_2(t)$, $G_3(t)$ and $G_4(t)$) may be referred to as a "prototype expression" for each stage. It is to be noted that the prototype expression per se of a stage of the task resource consumption does not take the start points of time of the stage into consideration. In other words, the prototype expressions which are stored in advance were under the presumption that each stage starts at the zero point of time. Then in prediction, the curve of the retrieved prototype expression is shifted along the time axis to start from the start point of time of the stage.

It is to be noted that what is shown in FIGS. 6A and 6B is only examples, and a task resource consumption may comprise any number of stages (including the possibility of only one stage), and each stage may have expression of any type of function.

According to an exemplary implementation, the step S501 of obtaining (for example, retrieving) a way of change for each stage of the task resource consumption may comprise obtaining (for example, retrieving) an expression representing the way of change of the task resource consumption with time for each stage of the task resource consumption according to the relationship between the ways of change and the computation logics. For example, the expressions of the stages of the task resource consumption associated with various types of tasks may have been be determined and pre-stored in storage devices of one or more nodes in advance, and may be retrieved for prediction.

According to an exemplary implementation, the determination of the above mentioned prototype expressions in association with a certain type of tasks may comprise determination of the stages and determination of an expression for each of the stages based on training data of task resource consumptions of one or more monitored tasks of this type. The determination of the stages of a certain type of tasks may be performed manually or by machine learning algorithms such as a K-Means method, a K-Nearest Neighbor method, a decision tree method or a SVM (Support Vector Machine) method based on the task resource consumptions of tasks having the same computation logics but different input data sizes which have been monitored in advance. The determination of an expression for each of the stages of the task resource consumption may be performed manually or by curve fitting based on the task resource consumptions of tasks of the same type but having different input data sizes which have been monitored. Any method may be used for the curve fitting, which may include but is not limited to a least square method, a Radial Basis Function (RBF) based method, an interpolation method, a neutral network based method, or the like. For example, by using one or more monitored resource consumptions with the same or different input data sizes, it may be determined that the prototype expression of the stage 2 of the task resource consumptions shown in FIGS. 6A and 6B is a quadratic function $G_2(t)=ax^2+bx+c$ and the coefficients a, b and c may also be determined.

Thereby, in association with each of the computation logics (types of tasks), a way of change (for example, reflected by the prototype expressions) of the task resource consumption with time may be generated from monitored task resource consumptions, and may be pre-stored in advance for each stage in association with the computation logic. Upon prediction for a task of a certain type, the way of change pre-stored in association with the type may be retrieved.

For example, for the type of tasks shown in FIGS. 6A and 6B, the prototype expressions indicating the way of change of the task resource consumptions may be determined in advance as the following and may be pre-stored in association with the type (particular computation logic):

Stage 1:$F=G_1(t)=t$;

Stage 2:$F=G_2(t)=t^2+2t+1$;

Stage 3:$F=G_3(t)=1.5$;

Stage 4:$F=G_4(t)=1.8-t$     Expression 1

In Expression 1, F represents the value of the task resource consumption, t represents time. It is to be noted that the above expressions are only exemplary, and various kinds of expressions may be possible.

According to an exemplary implementation, the step S503 of determining a duration of each stage of the task resource consumption based on an input data size of the task may be performed based on a relationship between values of duration times, stages and input data sizes. The relationship may have been determined and pre-stored in advance based on the task resource consumptions of tasks of the same type but having different input data sizes which have been monitored in advance. There may be such a relationship stored in association with each of the various types of tasks. For example, as shown in FIG. 6A, a monitored $T_{1-2}$ may be recorded as a value of duration time in the stage 2 of the task resource consumption in case of the input data size of N1, and generally, a monitored $T_{i-j}$ may be similarly recorded as a value of duration time in the stage j of the task resource consumption in case of the input data size of Ni. Thus, the relationship between a value of duration time, a stage and an input data size may be determined and pre-stored in advance based on the plurality of recorded $T_{i-j}$. In this way, with the input data size as a key, a value of duration time of each stage of the task resource consumption may be determined based on such a relationship. According to some exemplary implementations, such a relationship may take the form of a mathematical expression or a table. If the relationship takes the form of a mathematical expression, each mathematical expression for a stage of a type of a task may be determined in advance by curve fitting based on a plurality of pairs of duration times and input data sizes of training data. If the relationship takes the form of a table, it is possible that the table may only have discrete items corresponding to some input data sizes, and the duration times of other input data sizes may be determined by using interpolation or extrapolation.

The following Table 1 is an example of a table storing the relationship between a value of duration time, a stage and an input data size for a particular type of tasks which may be generated and stored in advance. It is to be noted that the table is merely exemplary and does not limit the specific form of such relationship.

TABLE 1

| Input data size | Time duration of stage 1 | Time duration of stage 2 | Time duration of stage 3 | ... | Time duration of stage j |
|---|---|---|---|---|---|
| N1 | $T_{1-1}$ | $T_{1-2}$ | $T_{1-3}$ | ... | $T_{1-j}$ |
| N2 | $T_{2-1}$ | $T_{2-2}$ | $T_{2-3}$ | ... | $T_{2-j}$ |
| N3 | $T_{3-1}$ | $T_{3-2}$ | $T_{3-3}$ | ... | $T_{3-j}$ |
| ... | ... | ... | ... | ... | ... |
| Ni | $T_{i-1}$ | $T_{i-2}$ | $T_{i-3}$ | ... | $T_{i-j}$ |

Since the value of duration time of each stage is determined for the tasks in correspondence to different input data sizes, the start time point and the end time point of the duration of each stage may be determined accordingly. In other words, it may be determined, for each stage, in which duration the prototype expression of the stage should be applied, in correspondence to different input data sizes. Thus, in prediction, a prototype expression of a stage should be predicted to start from the start time point of the stage as a zero time point, and extends until the end time point. For example, as shown in FIGS. 6A and 6B, although the stage 2 has the same prototype expression $G_2(t)$ for the task with the input data size N1 shown in FIG. 6A and the task with the input data size N2 shown in FIG. 6B, the prototype expression $G_2(t)$ will be applied from $t_{1-2}$ to $t_{1-3}$ as a duration of the stage 2 of the task with input data size N1 while the prototype expression $G_2(t)$ will be applied from $t_{2-2}$ to $t_{2-3}$ as a duration of the stage 2 of the task with input data size N2. It is to be noted that the prototype expression of a stage of the task resource consumption takes the start point of time of each stage as the zero point of time, so that the starting value of $G_2(t)$ is the same between the tasks with the input data size N1 and the input data size N2, that is, $G_2(0)$.

In this way, for each of the computation logics, a relationship between a value of duration time, a stage and an input data size may be pre-stored in advance for each type of tasks having respective computation logics. Upon prediction, the values of duration times of the stages corresponding to the input data size may be retrieved and thus the durations of the stages may be determined for a task having the same computation logics.

For example, if the task resource consumption is to be predicted for a task which has the same computation logics as those shown in FIGS. 6A and 6B but has the input data size of N3, the predicted task resource consumption for this task will be as follows according to Expression 1 (the way of change) and Table 1 (the relationship between the input data size and duration time of each stage):

Stage 1: $F=G_1(t)=t$, if $t<T_{3-1}$;

Stage 2: $F=G_2(t-T_{3-1})=-(t-T_{3-1})^2+2(t-T_{3-1})+1$, if $T_{3-1} \leq t < T_{3-2}$;

Stage 3: $F=G_3(t-T_{3-1}-T_{3-2})=1.5$, if $T_{3-2} \leq t < T_{3-3}$;

Stage 4: $F=G_4(t-T_{3-1}-T_{3-2}-T_{3-3})=1.8-(t-T_{3-1}-T_{3-2}-T_{3-3})$, if $T_{3-3} \leq t < T_{3-4}$    Expression 2

As described in the above, based on the type (computation logic) of the task and the input data size of the task, a task resource consumption comprising one or more stages may be predicted.

Although mathematical expressions have been described as examples of the way of change for the stages, tables storing discrete values of task resource consumptions in association with times may be used instead of the expressions, and the discrete values may be determined according to the monitored task resource consumption, in advance. In this case, it will not be necessary to identify various stages, but a group of discrete numerical data may be determined in advance for each input data size as the pre-stored task resource consumption by using training data of previously monitored tasks having the input data size and having the same computation logics.

Although an exemplary method of prediction of the task resource consumption according to an exemplary implementation of the present disclosure has been described with reference to the flowchart of FIG. 5, the way of predicting the task resource consumption is not limited to the one illustrated with reference to FIG. 5. According to an alternative exemplary implementation, it is possible to monitor, in advance, a plurality of task resource consumptions of tasks of different types and different input data sizes, and to generate and pre-store for each type of tasks, in advance, a function (a mathematical expression or a table storing discrete numerical values) representing the task resource consumption for each of the input data sizes. Therefore, each time the task resource consumption is to be predicted for a task of a certain type with a certain input data size, the function for a stage which has been stored in correspondence to the same type and the same or similar input data size may be selected as the prediction result for the stage.

In addition, there may also be tasks for which the input data size is fixed. For example, Map tasks having the same computation logics of a job in a Hadoop system will generally have the same input data size. For such tasks having a fixed input data size and the same computation logics, the task resource consumption of each of the tasks will be substantially identical. For example, the way of change of each stage may be determined in a similar way to that described in the foregoing, and therefore a task resource consumption may be determined based on the way of change and fixed duration times, and pre-stored for each task having certain computation logics, in advance. Thus, the prediction of a task resource consumption of a task with fixed input data size may be performed by retrieving the pre-stored task resource consumption which has been determined from execution of tasks having the same computation logics (of the same type).

Alternatively, for the tasks for which the input data size is fixed, it is also possible to generate a task resource consumption based on monitored tasks of the same type in advance, and to store, in advance, a sequence of discrete values of the task resource consumption in association with points of time. Therefore, each time the task resource consumption is to be predicted for a task, the sequence which has been stored for the same type may be retrieved as the prediction result for the task.

Some of the processes described in the above have been described as being possibly implemented "in advance". Such processes are not necessarily part of the step S401 or the method of the present disclosure, because any data resulting from such processes may have been determined and pre-stored before the method of the present disclosure is started, and is not necessarily generated during the implementation of the method of the present disclosure.

According to some exemplary implementations, it is possible that a task resource consumption of a task being executed on the node is predicted by the node itself, and therefore determining the predicted task resource consumption may comprise predicting the task resource consumption on the node (e.g. by an application manager on the node). For example, a task being executed on the node 207A may be managed by an application manager 213A which resides on the same node 207A, and in this case, the application manager 213A may predict the task resource consumption of the task and send the predicted task resource consumption to the node manager 209A of the node 207A.

According to some exemplary implementations, it is also possible that a task resource consumption of a task being executed on the node is predicted by another node and therefore determining the predicted task resource consumption may comprise receiving the predicted task resource consumption from another node (e.g. from an application manager on another node). For example, a task being executed on the node 207A may be managed by an application manager 213B which resides on another node 207B, and in this case, the application manager 213B of the other node may predict the task resource consumption of the task and send the predicted task resource consumption to the node manager 209A of the node 207A. In this case, the prediction operation per se is not necessarily a part of the step S401.

It is also possible that task resource consumptions of some of the tasks being executed on the node are predicted by the node itself and task resource consumptions of the others of the tasks being executed on the node are predicted by other nodes.

Based on the exemplary implementations described in the above, the predicted task resource consumptions of the tasks being executed on the node may be determined in the step S401. Since the node resource consumption of a node is a certain combination of the task resource consumptions of the tasks being executed on the node, a node resource consumption of the node may be predicted in the step S403 based at least on the predicted task resource consumptions of the tasks which are determined in the step S401. The predicted node resource consumption is a function of time, and reflects how the resource consumption of the node will change over time.

According to an exemplary implementation, the executions of the tasks being executed on the node may start at different times, and therefore by determining the timing information of the tasks, the predicted task resource consumptions may be combined based on time differences which are determined from the timing information of the tasks to thereby determine the predicted node resource consumption.

According to an exemplary implementation, the method may further comprise a step S402 of determining timing information of start of execution of each of the one or more tasks, and the predicting the node resource consumption of the node in the step S403 may be based at least on the predicted task resource consumption determined in the step S401 and the timing information for each of the one or more tasks determined in the step S402.

Although the step S402 is shown in FIG. 4 to be performed after the step S401, it is to be noted that the relationship of the timings of the step S401 and the step S402 are not limited thereto but may be arbitrary. It is also possible to perform the step S402 prior to the step S401, and it is also possible to perform the step S402 and step S401 substantially in parallel. Without explicit definition of an order, the steps defined in claims should not be interpreted with limitation of any specific order.

Then exemplary implementations of the step S402 will be described in which timing information of start of execution is determined for each of the one or more tasks being executed on the node. According to an example, the timing information for a task may comprise any information concerning the start time of the execution of the task, such as an absolute start time, a time difference with respect to a predetermined time, or a time difference with respect to each other. Since executions of the one or more tasks may have been started at different timings, the timing information of the start of execution of the one or more tasks may provide information on how the one or more predicted task resource consumptions should be shifted from each other if being combined to result in a predicted node resource consumption of the node.

According to an exemplary implementation, the timing information of a task may comprise a time at which the execution of the task started. For example, the node manager of the node may capture and record a start time of execution of the task. According to an exemplary implementation, the node manager of the node may capture and record a start time of a container in which the task is executed, as the start time of execution of the task. In this case, the step S402 may be performed after the step S401, prior to the step S401, or substantially in parallel with the step S401.

Alternatively, according to an exemplary implementation, the timing information of a task may comprise a time difference with respect to a predetermined time. The predetermined time may be any predetermined point of time, and may be, for example, a monitored time of a start of a predetermined task. Since the predetermined task might not be a task that is executed first, the time difference may take a positive value, a negative value or zero. According to an exemplary implementation, the time differences of the tasks may be determined by monitoring an actual node resource consumption of the node, and determining the time differences of the one or more tasks based on the predicted task resource consumption as determined in the step S401 and the monitored actual node resource consumption. In this case, the step S402 may be performed after the step S401.

The monitoring of the actual node resource consumption of the node may be implemented by any known technique that allows monitoring and recording resource consumption of a computing device, and is not limited to any specific method.

An exemplary implementation of determining the time differences of the tasks based on the predicted task resource consumption and the monitored actual node resource consumption will be described with reference to FIG. 7 which shows the illustrative principle of determining timing information of start of execution of tasks according to the exemplary implementation. Determining of the time differences of the tasks may comprise, for example, solving equation sets each of which equates a monitored node consumption to a combination of the predicted task resource consumptions of the tasks at a given time point.

Figure 7:
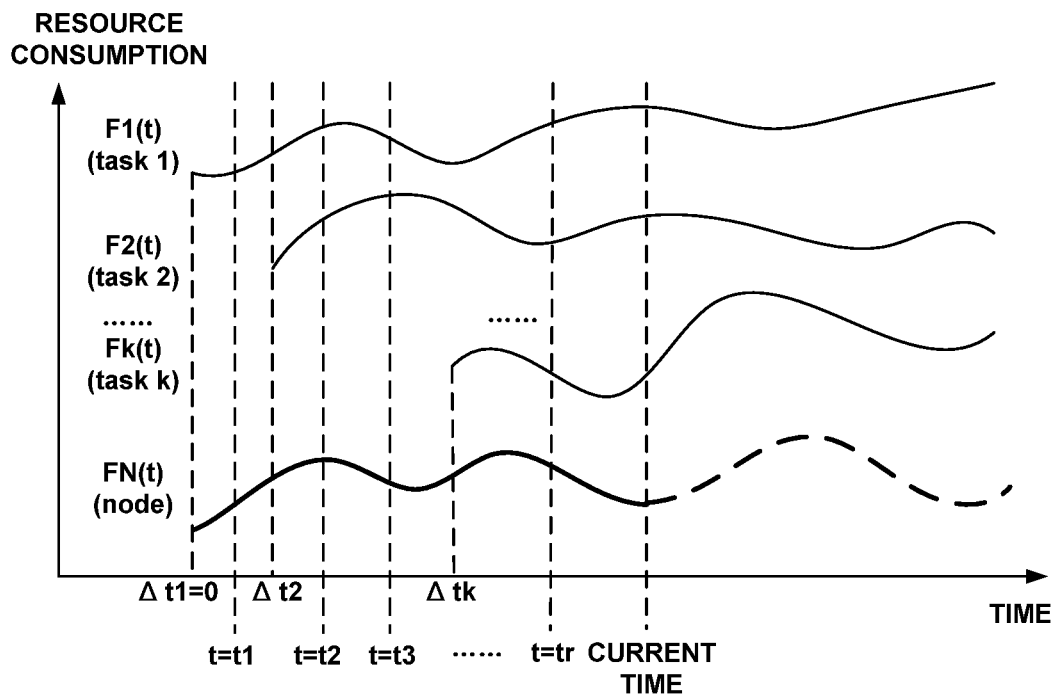
FIG. 7 shows illustrative principle of determining timing information of start of execution of tasks according to an exemplary implementation of the present invention.

For example, with reference to FIG. 7, it is presumed that the number of tasks being executed on the node is k, the predicted resource consumption for the task 1 is $F1(t)$, the predicted resource consumption for the task 2 is $F2(t)$, . . . the predicted resource consumption for the task k is $Fk(t)$. Tasks 1, 2, . . . and k may have different computation logics (types). The predicted resource consumptions for these tasks may be determined in a way as described with reference to the step S401. In addition, it is presumed that the monitored actual node resource consumption of the node is $FN(t)$. The time differences of the start times of executions of the tasks 1, 2, . . . k with respect to a predetermined time may be denoted by $\Delta t1, \Delta t2, \ldots \Delta tk$, respectively. With these presumptions, an equation may be determined as follows at any time point t:

$$FN(t)=F1(t-\Delta t1)+F2(t-\Delta t2)+F3(t-\Delta t3) \ldots +Fk(t-\Delta tk) \tag{Expression 3}$$

A plurality of time points (for example, t1, t2, t3 ... tr as shown in FIG. 7, where r is the number of the time points and is generally larger than or equal than k) may be determined arbitrarily or at an even interval, and by substituting each of t1, t2, t3 ... tr for t in Expression 3, an equation set may be determined as follows:

$$FN(t1)=F1(t1-\Delta t1)+F2(t1-\Delta t2)+F3(t1-\Delta t3) \ldots +Fk(t1-\Delta tk),$$

$$FN(t2)=F1(t2-\Delta t1)+F2(t2-\Delta t2)+F3(t2-\Delta t3) \ldots +Fk(t2-\Delta tk),$$

$$FN(tr)=F1(tr-\Delta t1)+F2(tr-\Delta t2)+F3(tr-\Delta t3) \ldots +Fk(tr-\Delta tk) \quad \text{(Expression 4)}$$

In Expression 4, the only unknowns are $\Delta t1$, $\Delta t2$, $\Delta t3$ ... $\Delta tk$, and therefore if there are sufficient equations in the equation set of Expression 4, the values of these unknowns including $\Delta t1$, $\Delta t2$, $\Delta t3$ ... $\Delta tk$ may be determined by solving the equation set. If the start time of execution of the task 1 is taken as the predetermined time, $\Delta t1$ may take a zero value.

According to an exemplary implementation, one or more of the functions may comprise different stages each of which may corresponds to a different function (e.g. a different expression or a different sequence of discrete numerical values). In addition, it may be deemed that there is a pre-stage of a task which is prior to the execution of the task, and a term of an equation in the equation set may take zero value during the pre-stage of the task in which the time embraced in the parentheses as an argument turns out to be lower than zero. In this case, it is possible to try different stage presumptions for the different time points for each function, and exclude stage presumptions which are unreasonable and only keep the results obtained from reasonable stage presumptions as the appropriate solution set of the equation set. Here the "reasonable stage presumption" may mean a stage presumption which may comply with the actual stages resulting from the calculated time differences $\Delta t1$, $\Delta t2$, $\Delta t3$ ... $\Delta tk$ for each of the tasks. For example, if a solution of $\Delta t2$ is obtained under the presumption that t1 is in the first stage of $F2(t)$ of the task 2, then the presumption will be considered unreasonable if t1-$\Delta t2$ actually falls within the second stage of $F2(t)$. For another example, if the stage presumption leads to a result based on which an earlier time point falls within a later stage but a later time point falls within an earlier stage for a task, then the presumption will be considered unreasonable.

According to an exemplary implementation, it is possible that multiple reasonable stage presumptions may be determined, and therefore multiple sets of solutions of the time differences $\Delta t1$, $\Delta t2$, $\Delta t3$ ... $\Delta tk$ may be determined. In this case, more equations may be obtained by substituting more time points into Expression 3 to test which set of solutions is the correct one. In other words, it is possible to have r sufficiently larger than k in Expression (4) in order to exclude unreasonable solutions.

According to an exemplary implementation, it is possible that a task may be executed in a node periodically, each time with different input data. In this case, the task resource consumption for the periodically executed task may be deemed as a periodic function, and each of the expressions within the parentheses in Expression 4 may be replaced by a remainder obtained from division by a time length of one cycle of each task.

In the way as described above, a start time of execution of each task may be monitored and recorded, or a time difference of start of execution of each task may be determined, as the timing information of each task.

According to an exemplary implementation, in the step S403, a node resource consumption of the node may be predicted based on the predicted task resource consumption determined in the step S401 and the timing information for each of the one or more tasks determined in the step S402.

According to an exemplary implementation, the predicting of a node resource consumption of the node may comprise, for example, combining the predicted task resource consumptions based on time differences which are determined from the timing information of the one or more tasks. In the case where the start time of execution of each task has been monitored and recorded as the timing information in the step S402, the time differences may be determined by calculating differences between the recorded times. In the case where the time differences have been determined as the timing information in the step S402, the time differences may be determined directly from the timing information. The predicted task resource consumptions of the tasks may each be time-shifted according to their respective time difference, and then be combined (summed) to determine the predicted node resource consumption.

The curve FN(t) shown in FIG. 7 illustrates an example of a node resource consumption according to an exemplary implementation, in which the solid part of the curve represents a monitored node resource consumption prior to a current time and the broken part of the curve represents the predicted node resource consumption after the current time.

According to an exemplary implementation, in response to a start of execution of a further task, the predicted node resource consumption may be updated. The updating of the node resource consumption may, for example, comprise: determining a task resource consumption predicted for a further task that is newly executed on the node; and updating the predicted node resource consumption of the node based at least on the predicted task resource consumption for the further task. The determining of the task resource consumption predicted for the further task may be performed in a similar way to the step S401. According to an exemplary implementation, the updating of the node resource consumption may further comprise determining timing information of start of execution of the further task, and the predicted node resource consumption of the node may be updated based on at least the predicted task resource consumption for the further task and the timing information of the further task. The determining of the timing information of start of execution of the further task may be performed in a similar way to the step S402. For example, the timing information of start of execution of the further task may be monitored and recorded by the node manager, or can be determined based on the timing information of other already started tasks, the predicted task resource consumptions and the further monitored actual node resource consumption. The updating of the predicted node resource consumption of the node may be performed by combining the previously predicted node resource consumption and the predicted task resource consumption for the further task based on the timing information of the start of execution of the further task.

Having the predicted node resource consumption, a resource may be allocated to a new task and a start time of execution of the new task may be set based at least on the predicted node resource consumption.

Figure 8:
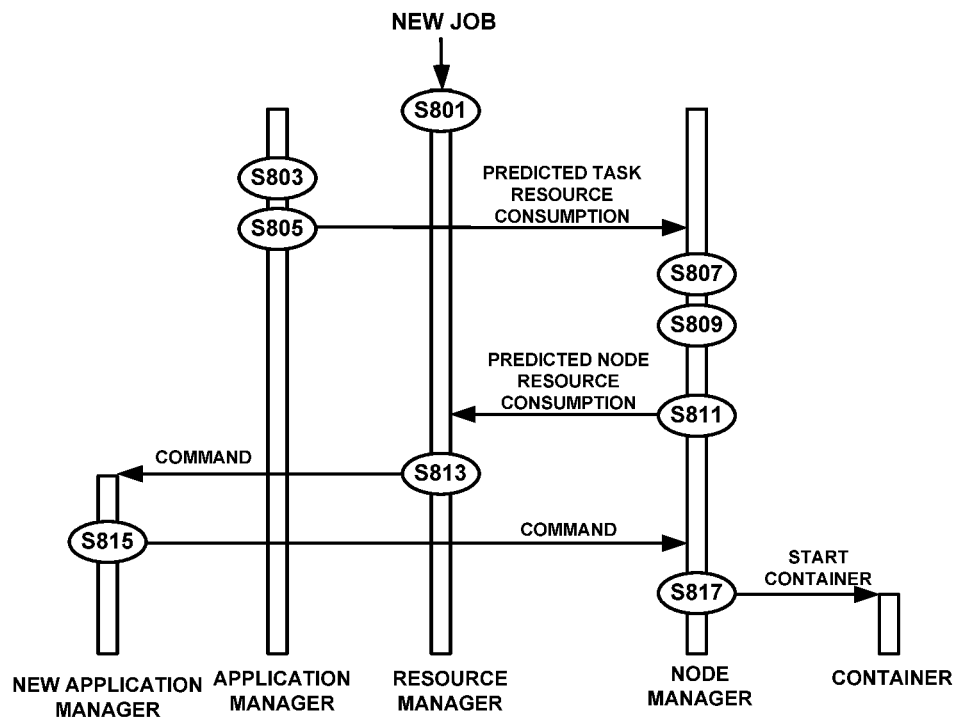
FIG. 8 is a diagram showing an example of a workflow according to an exemplary implementation of the present invention.

FIG. 8 is a diagram showing an example of a workflow according to an exemplary implementation of the present disclosure. The workflow illustrated in FIG. 8 may be implemented in a Hadoop system as shown in FIG. 2. However, it is to be noted that FIG. 8 and the description made with reference thereto only provide an example for the purpose of illustration, and the present invention is not limited to the specific example.

In the step S801, the resource manager may receive a new job from a client, and place the new job into a job queue in which jobs wait for further processing.

In the step S803, an application manager may predict a task resource consumption for a task being executed on a node according to information determined from one or more already monitored task resource consumptions of one or more already executed tasks, wherein the predicted task resource consumption is a function of time. Although FIG. 8 only shows one application manager performing the prediction for one task, it is also possible that there may be one or more application managers in charge of one or more tasks having different computation logics, and each of the one or more application managers predicts a task resource consumption for respective one or more tasks. The prediction in the step S803 may be performed in a similar way as described in the foregoing.

In the step S805, the application manager may send the predicted task resource consumption to the node manager of the node. In other words, in the step S805, the node manager may receive, from one or more application managers inside or outside the node, the predicted task resource consumptions for one or more tasks being executed on the node, as has been described with reference to the step S401.

In the step S807, the node manager may determine timing information of start of execution of each of the one or more tasks, as has been described with reference to the step S402. It is to be noted that although the step S807 is depicted in FIG. 8 as being performed after the step S805, it is also possible that the step S807 is performed prior to the step S805 or substantially in parallel the step S805.

In the step S809, the node manager may predict a node resource consumption of the node based on the predicted task resource consumption and the timing information for each of the one or more tasks, as described with reference to the step S403, wherein the node resource consumption is a function of time. In the step S811, the node manager may send the predicted node resource consumption to the resource manager. Although only one node manager for one node is shown in FIG. 8, it is possible that the resource manager receives more than one predicted node resource consumption from more than one node.

In the step S813, the resource manager may divide the aforementioned new job into new tasks, sends a command to a certain node to establish a new application manager for the new job on the certain node, and sends a command indicating a task assignment and a resource allocation for the new job to the new application manager. The divided tasks may be sent from the resource manager directly to respective nodes or may be sent to the new application manager. According to an exemplary implementation, the resource manager may also send, to the new application manager, data and information relating to the type of the new job which may be determined or obtained in advance. Such data and information may comprise, for example, the task resource consumptions, the functions (expressions and/or sequences of discrete numerical values) of the stages of the task resource consumptions associated with the type of the new job, and/or the relationships between values of duration times of stages and input data sizes, which have been monitored or determined for tasks for the same type of job in advance. Alternatively, such data and information may also be stored in computation nodes in which the corresponding application managers reside.

At least part of the task assignment and the resource allocation may be determined based on the predicted node resource consumption that the resource manager has received from each node. For example, if a resource determined by subtracting the resource consumption indicated in the predicated node resource consumption from the full resource of the node will be larger than the maximum resource consumption of a new task for an execution time period of the new task, the resource manager may assign the new task to the node and commands a resource allocation for the new task on the node.

According to an exemplary implementation, the command indicating the allocation of resource may comprise container information which includes, for example, a container number, a container resource and a container start time of each of the containers for the new tasks managed by the new application manager. In addition, the command indicating the allocation of resource may further comprise which node the each container should reside on.

In the step S815, the new application manager may send commands including the aforementioned container information to the corresponding nodes on which the corresponding new tasks are to be executed. In a case where the divided tasks have been sent from the resource manager to the new application manager, the new application manager may also forward the divided tasks to the corresponding nodes. Thus, each of the commands sent from the new application manager to the node may comprise information on resource allocation which is determined by the resource manager based at least on the predicted node resource consumption of the node.

In the step S817, in response to receipt of the command from the resource manager, the node manager may start a container on the node by allocating a resource for the container as commanded, and start execution of the corresponding new task by using the container. The allocation of resource for the new task is based at least on the predicted node resource consumption.

According to an exemplary implementation, during the whole procedure, the application manager may monitor task resource consumptions from time to time, and the monitored task resource consumptions may be used to provide information for use in predicting task resource consumptions. According to an exemplary implementation, during the whole procedure, the node manager may monitor the node resource consumption from time to time, and the monitored task resource consumptions may be used for other operations (for example, operations in step S807) or may be sent to other applications for their use.

According to an exemplary implementation, multiple node resource consumptions may be predicted for different kinds of resources such as memory and CPU on the node, and the task assignment and the resource allocation for the node may be performed based on the multiple predicted node resource consumptions.

As described in the above, since a node resource consumption may be predicted based on the predicted task resource consumptions and timing information of start of execution of the tasks, the predicted node resource consumption may comprise dynamic information on how the node resource consumption will actually change in the future. Therefore, resource management may be carried out based on the dynamic node resource consumption prediction instead of a static presumption of current node resource consumption such as the maximum resource consumptions of the tasks. In this way, a more flexible resource management may be achieved. For example, even if the static presumption shows that there is no free resource available, there might be free resources identified according to the dynamic node resource consumption prediction, and thus such free resources may be utilized in resource management which would have been wasted according to the existing static resource management.

Furthermore, according to some exemplary implementations, since the predicted node resource consumption comprises dynamic information on how the node resource consumption will actually change in the future, it is possible to include, in the container information, the container start time indicating a start time of execution of the corresponding new task. The container start time may be determined based at least on the predicted node resource consumption. This may be more flexible than the existing static resource management in which only static presumption can be made and no container start time can be appropriately determined in advance.

In the present disclosure, the term "function" indicates a relationship between two or more values. The expression of "X as a function of Y" means that there is a relationship, correlation, dependence or association between X and Y, and the function indicates how Y may change (or not change) with respect to X. According to some exemplary implementations, such a function or relationship may be embodied as a mathematical expression which may represent a continuous or discontinuous curve, straight line, or broken line. According to some exemplary implementations, such a function or relationship may be embodied as correspondence between discrete values stored, for example, in a table. In the case where the function or relationship embodied as such a table is to used, values obtained by interpolation and/or extrapolation may be adopted in response to a query between two discrete values in the table.

Exemplary Aspects, Using a Cloud-Computing Environment

Although this detailed description includes an exemplary embodiment of the present invention in a cloud-computing environment, it is to be understood that implementation of the teachings recited herein are not limited to such a cloud-computing environment. Rather, embodiments of the present invention are capable of being implemented in conjunction with any other type of computing environment now known or later developed.

Cloud-computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud-computing environment is service oriented with a focus on statelessness, low coupling, modularity, and semantic interoperability. At the heart of cloud-computing is an infrastructure comprising a network of interconnected nodes.

Referring now to FIG. 1, a schematic of an example of a cloud-computing node is shown. Cloud-computing node 10 is only one example of a suitable node and is not intended to suggest any limitation as to the scope of use or functionality of embodiments of the invention described herein. Regardless, cloud-computing node 10 is capable of being implemented and/or performing any of the functionality set forth herein.

Although cloud-computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud-computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud-computing environments where tasks are performed by remote processing circuits that are linked through a communications network. In a distributed cloud-computing environment, program modules may be located in both local and remote computer system storage media including memory storage circuits.

Referring again to FIG. 1, computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 9:
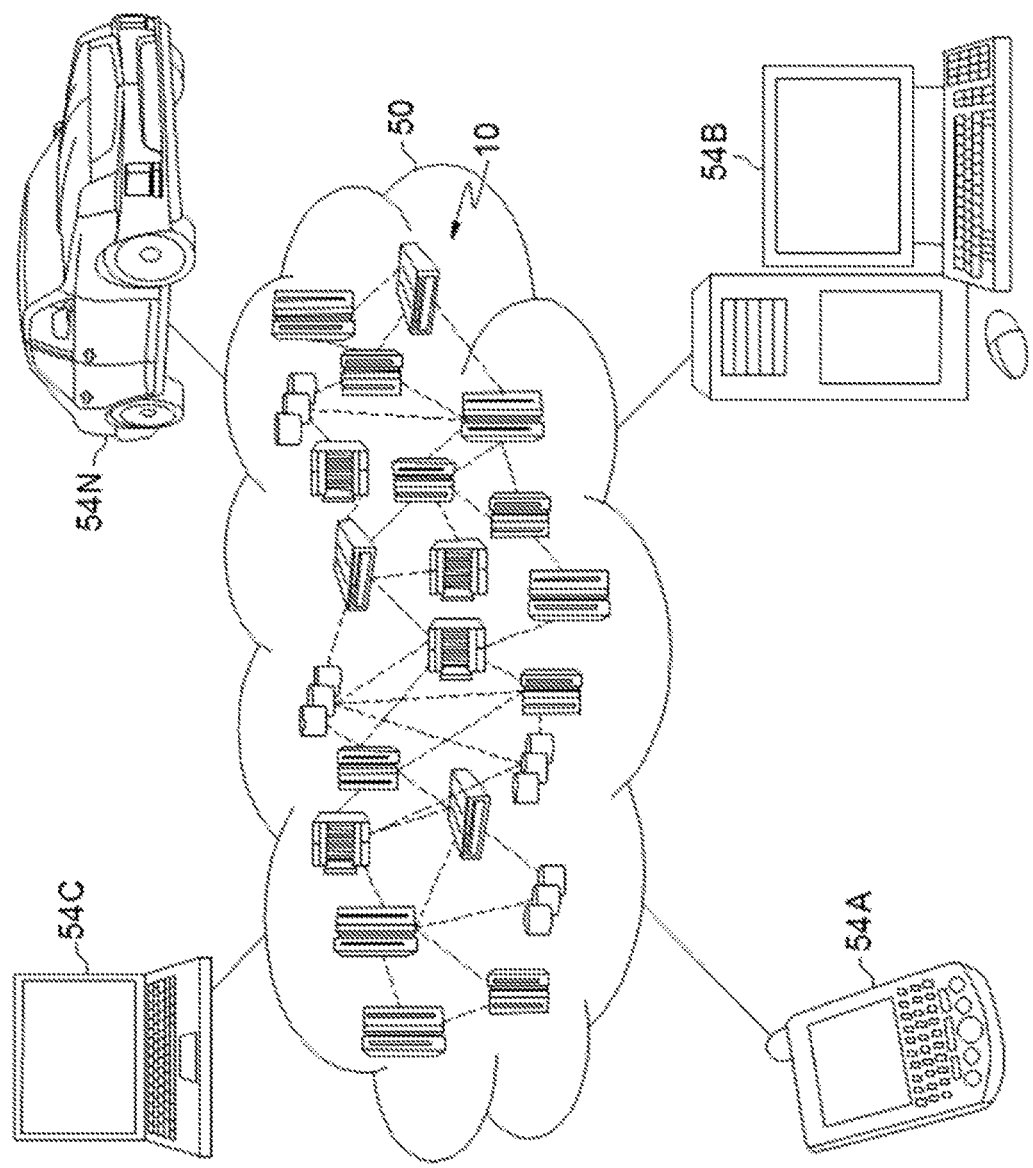
FIG. 9 depicts a cloud computing environment 50 according to an embodiment of the present invention.

Referring now to FIG. 9, illustrative cloud-computing environment 50 is depicted. As shown, cloud-computing environment 50 comprises one or more cloud-computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud-computing environment 50 to offer infrastructure, platforms and/or software as services for which a cloud consumer does not need to maintain resources on a local computing circuit. It is understood that the types of computing circuits 54A-N shown in FIG. 9 are intended to be illustrative only and that computing nodes 10 and cloud-computing environment 50 can communicate with any type of computerized circuit over any type of network and/or network addressable connection (e.g., using a web browser).

Figure 10:
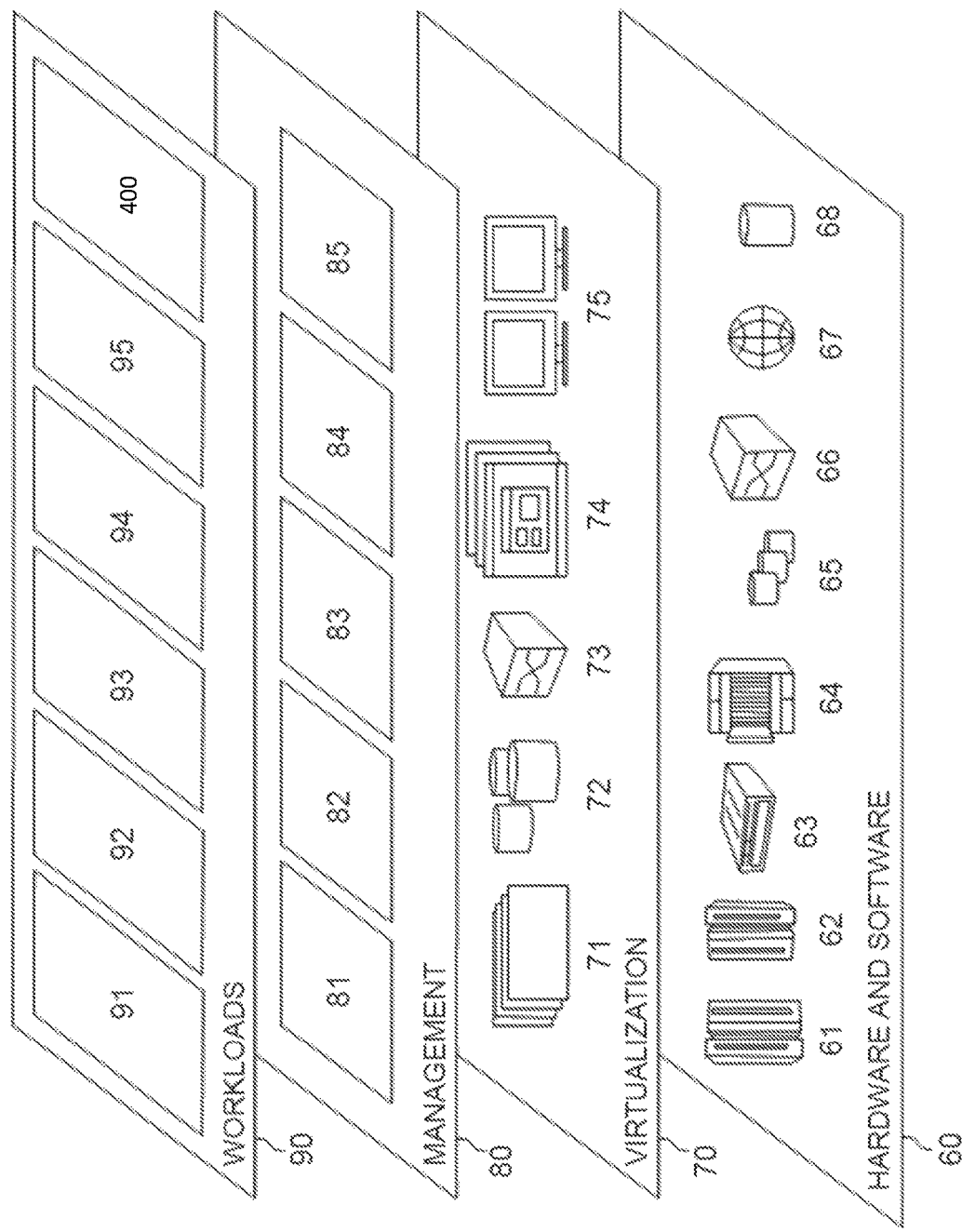
FIG. 10 depicts abstraction model layers according to an embodiment of the present invention.

Referring now to FIG. 10, an exemplary set of functional abstraction layers provided by cloud-computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud-computing environment. Metering and Pricing 82 provide cost tracking as resources are utilized within the cloud-computing environment, and billing or invoicing for consumption of these resources. In one example, these resources may comprise application software licenses. Security provides identity verification for cloud consumers and tasks, as well as protection for data and other resources. User portal 83 provides access to the cloud-computing environment for consumers and system administrators. Service level management 84 provides cloud-computing resource allocation and management such that required service levels are met. Service Level Agreement (SLA) planning and fulfillment 85 provide pre-arrangement for, and procurement of, cloud-computing resources for which a future requirement is anticipated in accordance with an SLA.

Workloads layer 90 provides examples of functionality for which the cloud-computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the distributed computation method 400.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented method in a distributed computation system, comprising:
   determining a task resource consumption predicted for each of one or more tasks being executed on a node, wherein the task resource consumption is a function of time, each of the one or more tasks having respective computation logics;
   predicting a node resource consumption of the node based at least on the predicted task resource consumption, wherein the node resource consumption is a function of time; and
   pre-storing, in advance, for each of the one or more tasks having the respective computation logics a functional mathematical relationship between a value of a duration time, a stage, and an input data size,
   wherein, when the predicting predicts, the value of the duration time of the stage corresponding to the input data size are retrieved and a duration of a stage is determined for a different task having a same computation logic to the respective computation log of the functional mathematical relationship, wherein the functional mathematical relationship is created in advance in the pre-storing,
   the method further comprising allocating a resource to a new task and setting a start time of execution of the new task based at least on the predicted node resource consumption.

2. The computer-implemented method according to claim 1, further comprising:
   determining timing information of start of execution of each of the one or more tasks,
   wherein the predicting the node resource consumption of the node is based at least on the predicted task resource consumption and the timing information for each of the one or more tasks.

3. The computer-implemented method according to claim 2, wherein the determining the timing information comprises:
   monitoring an actual node resource consumption of the node; and
   determining time differences between start times of executions of the one or more tasks based on the predicted task resource consumptions and the monitored actual node resource consumption.

4. The computer-implemented method according to claim 2, wherein the predicting a node resource consumption of the node comprises:
   combining the predicted task resource consumptions based on time differences which are determined from the timing information of the one or more tasks.

5. The computer-implemented method according to claim 1, wherein the predicted task resource consumption of at least one of the one or more tasks is predicted based on one or more of a pre-stored task resource consumptions of one or more monitored tasks, and
   wherein the one or more monitored tasks and the at least one of the one or more tasks have the same computation logics.

6. The computer-implemented method according to claim 1, wherein the task resource consumption of a task selected from the one or more tasks being executed on a node is predicted based on the computation logic of the task and the input data size of the task.

7. The computer-implemented method according to claim 1, wherein the task resource consumption of a task selected from the one or more tasks being executed on a node is predicted by:
   obtaining a way of change of the task resource consumption with time for each stage of the task resource consumption; and determining the value of the duration of each stage of the task resource consumption based on the input data size of the task.

8. The computer-implemented method according to claim 1, further comprising:
   determining a task resource consumption predicted for a further task that is newly executed on the node; and
   updating the predicted node resource consumption of the node based at least on the predicted task resource consumption for the further task.

9. The computer-implemented method of claim 1, embodied in a cloud-computing environment.

10. The computer-implemented method according to claim 1, wherein, for the tasks for which the input data size is fixed, predicting the task resource consumption based on monitored tasks of a same type of task in advance, and to store, in advance, a sequence of discrete values of the task resource consumption in association with points of time in the duration of time.

11. A distributed computation system, comprising:
   a processor, and
   a memory, the memory storing instructions to cause the processor to perform:
      determining a task resource consumption predicted for each of one or more tasks being executed on a node, wherein the task resource consumption is a function of time, each of the one or more tasks having respective computation logics;
      predicting a node resource consumption of the node based at least on the predicted task resource consumption, wherein the node resource consumption is a function of time; and
      pre-storing, in advance, for each of the one or more tasks having the respective computation logics a functional mathematical relationship between a value of a duration time, a stage, and an input data size,
   wherein, when the predicting predicts, the value of the duration time of the stage corresponding to the input data size are retrieved and a duration of a stage is determined for a different task having a same computation logic to the respective computation log of the functional mathematical relationship, wherein the functional mathematical relationship is created in advance in the pre-storing, and
   wherein the memory further stores instructions to cause the processor to perform allocating a resource to a new task and setting a start time of execution of the new task based at least on the predicted node resource consumption.

12. The system according to claim 11, wherein the memory further stores instructions to cause the processor to perform:
   determining timing information of start of execution of each of the one or more tasks, and
   wherein the predicting the node resource consumption of the node is based at least on the predicted task resource consumption and the timing information for each of the one or more tasks.

13. The system according to claim 12, wherein to determine the timing information, the memory further stores instructions to cause the processor to perform:
   monitoring an actual node resource consumption of the node; and
   determining time differences between start times of executions of the one or more tasks based on the predicted task resource consumptions and the monitored actual node resource consumption.

14. The system according to claim 11, wherein the predicted task resource consumption of at least one of the one or more tasks is predicted based on one or more of a pre-stored task resource consumptions of one or more monitored tasks, and
   wherein the one or more monitored tasks and the at least one of the one or more tasks have the same computation logics.

15. The system according to claim 11, wherein the task resource consumption of a task selected from the one or more tasks being executed on a node is predicted based on the computation logic of the task and the input data size of the task.

16. The system of claim 11, embodied in a cloud-computing environment.

17. A non-transitory computer program product for a distributed computation system, the computer program product comprising a computer-readable storage medium having program instructions embodied therewith, the program instructions being executable by a computer to cause the computer to perform:
   determining a task resource consumption predicted for each of one or more tasks being executed on a node, wherein the task resource consumption is a function of time, each of the one or more tasks having respective computation logics;
   predicting a node resource consumption of the node based at least on the predicted task resource consumption, wherein the node resource consumption is a function of time; and
   pre-storing, in advance, for each of the one or more tasks having the respective computation logics a functional mathematical relationship between a value of a duration time, a stage, and an input data size,
   wherein, when the predicting predicts, the value of the duration time of the stage corresponding to the input data size are retrieved and a duration of a stage is determined for a different task having a same computation logic to the respective computation, log of the functional mathematical relationship, wherein the functional mathematical relationship is created in advance in the pre-storing, and
   wherein the program further stores instructions executable by a computer to cause the computer to perform allocating a resource to a new task and setting a start time of execution of the new task based at least on the predicted node resource consumption.

18. The non-transitory computer program product according to claim 17, wherein the program further stores instructions executable by a computer to cause the computer to perform:
   determining timing information of start of execution of each of the one or more tasks, and
   wherein the predicting the node resource consumption of the node is based on the predicted task resource consumption and the timing information for each of the one or more tasks.

19. The non-transitory computer program product according to claim 17, wherein the predicted task resource consumption of at least one of the one or more tasks is predicted based on one or more of a pre-stored task resource consumptions of one or more monitored tasks, and wherein the one or more monitored tasks and the at least one of the one or more tasks have the same computation logics.

* * * * *